United States Patent [19]
Durso

[11] Patent Number: 5,186,013
[45] Date of Patent: Feb. 16, 1993

[54] REFRIGERANT POWER UNIT AND METHOD FOR REFRIGERATION

[76] Inventor: Thomas Durso, 5522 Madison St., Morton Grove, Ill. 60053

[21] Appl. No.: 602,478

[22] Filed: Oct. 22, 1990

Related U.S. Application Data

[63] Continuation-in-part of Ser. No. 309,937, Feb. 10, 1989, abandoned.

[51] Int. Cl.[5] ............................................. F25B 27/00
[52] U.S. Cl. ..................................... 62/115; 62/238.4; 62/501
[58] Field of Search ...................... 62/238.4, 501, 116, 62/115, 323.2; 60/651, 671

[56]  References Cited

U.S. PATENT DOCUMENTS

| | | | |
|---|---|---|---|
| 3,194,026 | 7/1965 | La Fleur | 62/238.4 |
| 3,287,901 | 11/1966 | Tauer | 60/671 |
| 3,292,366 | 12/1966 | Rice et al. | 60/651 |
| 3,314,654 | 4/1967 | Thenault | 253/78 |
| 3,479,817 | 11/1969 | Minto | 60/671 |
| 3,558,237 | 1/1971 | Wall | 415/115 |
| 4,118,934 | 10/1978 | Brola | 62/238.4 |
| 4,170,116 | 10/1979 | Williams | 62/116 |
| 4,235,079 | 11/1980 | Masser | 62/116 |
| 4,422,297 | 12/1983 | Rojey | 60/671 X |
| 4,471,622 | 9/1984 | Kuwahara | 60/667 |
| 4,873,834 | 10/1989 | Cox | 62/87 |

FOREIGN PATENT DOCUMENTS 1941200  2/1970  Fed. Rep. of Germany .

OTHER PUBLICATIONS

Engelhorn, H. R. "Erfahrungen bei der Abwärmenutzung mit ORC-Anlagen", Brennstoff, Wärme, Kraft, vol. 40, No. 9, pp. 334–338 (Apr. 1988).
Koebbeman, W. F. "Geothermal Wellhead Application of a 1-MW Industrial ORC Power System", Proceedings of the 20th Intersociety Energy Conversion Engineering Conference, pp. 2712–2717 (May 1985).

*Primary Examiner*—William E. Wayner
*Attorney, Agent, or Firm*—Arnold, White & Durkee

[57] ABSTRACT

A refrigerant power unit includes a closed piping loop containing refrigerant. The refrigerant is pumped to an evaporator where it changes to a saturated vapor. It is directed across a generator absorbing additional heat energy and changing to a super-heated hot gas. The refrigerant is directed through the nozzles in a turbine and impinges upon turbine blades. As the refrigerant passes around the turbine blades, it expands and exits the turbine blades in an axial direction. The enthalpy, temperature and pressure of the refrigerant drops, reducing the refrigerant to a saturated vapor. The refrigerant then enters a condenser heat exchanger dissipating heat into the surrounding medium, reducing the enthalpy of the refrigerant, changing the refrigerant into a liquid before entering the receiver tank. A pump draws the liquid refrigerant from the receiver tank and pressurizes the system. The refrigerant is directed to the inlet of the evaporator, completing the cycle through the refrigerant power unit. A more detailed system includes an additional piping segment, between the receiver tank and the generator, which contains an evaporator, a compressor and a motor. Another system includes a second evaporator between the evaporator and the generator. It includes a second closed piping loop containing a compressor and a motor between the first and third evaporators. The loop also provides the heating refrigerant for the first evaporator coil and the coolant refrigerant inside the third evaporator coil.

45 Claims, 8 Drawing Sheets

PRESSURE - ENTHALPY DIAGRAM

PRESSURE-ENTHALPY DIAGRAM

PRESSURE-ENTHALPY DIAGRAM

REFRIGERANT POWER UNIT AND METHOD FOR REFRIGERATION

CROSS-REFERENCE TO RELATED APPLICATION

This application is a continuation-in-part of application Ser. No. 07/309,937 filed Feb. 10, 1989 now abandoned.

BACKGROUND OF THE INVENTION

1. A Field Of The Invention

The present invention relates to a new and improved system and method for cooling a medium, and more particularly, to a new and improved refrigerant power unit for cooling a medium such as ambient air or other fluid and to a new and improved method for using a refrigerant power unit to cool ambient air.

2. Description Of The Background Art

Mechanical refrigeration has been available for the last 150 years and has been used in a variety of circumstances that require a reduction or removal of heat from an enclosed area. The typical refrigeration cycle operates on the principle that a volatile refrigerant in liquid form will absorb heat upon evaporation. This change of state accomplishes the cooling effect in a refrigeration cycle.

Known refrigeration cycles include a compressor, a condenser, an expansion valve and an evaporator all in a closed loop. In this loop, the evaporator is the element in which cooling is performed and evaporation takes place. When liquid refrigerant flows from the higher pressure of the condenser to the lower pressure of the evaporator, its rate of flow must be controlled by a metering device. In the past, the metering device has been a thermal expansion valve. The refrigerant expands as it moves through the expansion valve. As this occurs, the refrigerant cools to the saturation temperature. To accomplish this cooling, the liquid must give up heat; and this heat is given to the nearest medium, which are adjacent molecules of refrigerant. Taking on this heat at the lower pressure vaporizes part of the refrigerant until the cool refrigerant vapor and the cool liquid refrigerant are in balance at the saturation temperature corresponding to the lower pressure. The vapor resulting from this vaporation is called "flash gas", and its amount is referred to as percent flash gas. Typical percentages of flash gas at air conditioning levels of temperature are usually in the range of 20 to 30 percent. This is an inherent part of a refrigerant cycle, and it detracts from the useful capacity of the cycle. It is therefore desirable that the refrigerant have a low specific heat so that the flash gas will be at a minimum.

For refrigerant to flow through the evaporator, there must be a pressure differential between the inlet and outlet of the evaporator. As the refrigerant flows through the evaporator, the pressure is lowered. The corresponding saturation pressure is also lowered; and the balance of liquid refrigerant must be cooled by further evaporation. The percent flash gas thus increases and the refrigeration effect decreases as refrigerant progresses into lower pressures in its path through the evaporator. As the refrigerant takes on heat from the medium being cooled, the balance of the liquid evaporates. In order to make full use of the refrigerant circulated, it is desirable to evaporate all of the refrigerant before it leaves the evaporator.

To maintain proper pressure, and hence, saturation or boiling temperature in the evaporator, it is necessary to pull off refrigerant vapor continuously and as rapidly as it is formed. This is the function of the compressor. If the compressor withdraws vapor faster than vapor is created by the load on the evaporator, the pressure, and hence, the temperature in the evaporator goes down. If the load increases and boils off refrigerant faster than the compressor withdraws it, the pressure and temperature rise.

To convert refrigerant vapor to a liquid so that it may be used again, the vapor must be condensed by removing heat from it. To do this, some medium to which the heat can flow must be used. To effect the desired heat flow, the temperature of the refrigerant must be higher than the temperature of the medium. A second function of the compressor therefore, is to raise the temperature of the refrigerant above the temperature of the medium. This is done by compressing the refrigerant which raises its temperature and permits the medium to cool the refrigerant and condense it to a liquid state.

Refrigerant leaves the evaporator and enters a compressor as either a saturated or super heated vapor. The refrigerant takes on heat during compression and leaves the compressor in a super heated state with more energy and hence more heat than it had when it entered the compressor. This increase in heat is referred to as the heat of compression and is equivalent to the work done on the vapor as it is being compressed.

Upon leaving the compressor, the refrigerant enters a condenser, also in the loop. In the condenser, heat is removed from the refrigerant by providing a medium at a lower temperature to which the heat can flow and be dissipated. The condenser removes heat taken on by the refrigerant in the evaporator and during the compression process. From the condenser, refrigerant is routed through the expansion valve back to the evaporator completing one cycle.

In many refrigeration systems of the type described, the different components are remotely located from each other, requiring long runs of refrigerant piping, electrical power and control wiring. This results in a loss of heat energy and the unit takes up a large amount of valuable space. It is desirable to provide a refrigeration system that minimizes flash gas losses and losses resulting from remotely located components, while requiring a small amount of space.

SUMMARY OF THE INVENTION

An object of the present invention is to provide a new and improved refrigerant power unit.

Another object of the present invention is to provide a new and improved method of refrigeration.

Still another object of the present invention is to provide a new and improved refrigeration system including a refrigerant liquid pump and turbine.

Yet another object of the present invention is to use heat energy absorbed by the refrigerant during the operation of a refrigeration compressor, pump and its motors, and turbine generator to provide a high enthalpy super heated refrigerant gas entering the turbine.

A further object of the present invention is to use a new and improved turbine generator in a refrigeration system to develop electrical energy beyond the requirements of the system by capturing heat energy of a fluid passing across an evaporating heat exchanger, which may be sun radiant energy supplied from an auxiliary solar collector panel. Such heat energy is transferred along with the heat energy from motors used in the system and a turbine generator into the refrigerant fluid of the system.

Another object of the present invention is to provide a new and improved refrigeration system with all of its components, except heat exchangers which transfer external heat energy, enclosed within a unitary casing surrounded by a suitable insulation to eliminate most of the operating noise and to allow for maximum capture of heat energy dissipated from the motor and generator in the system.

Another object of the present invention is to gain cooling capacity in the evaporator of a refrigeration system and to eliminate flash gas losses through the use of a pump and a turbine that drops the pressure and temperature of a refrigerant as it passes through the turbine to a point where the refrigerant enters the condenser at a lower temperature which allows the evaporator's cooling capacity to increase.

Briefly, one system of the present invention is directed to a new and improved refrigeration system and to a method of refrigeration. The refrigeration system of the present invention includes a gas-tight, closed piping loop through which flows a refrigerant. Any refrigerant may be used in these systems, such as chlorodifluoromethane, R-22. An evaporator heat exchanger with an inlet and outlet is included in the loop. A receiver tank stores low-enthalpy liquid refrigerant. The suction side of the refrigerant pump draws liquid refrigerant from the receiver tank and feeds the evaporator heat exchanger inlet tube at a high pressure. Heat is then transferred through the walls of the evaporator heat exchanger from the medium to be cooled which has a higher temperature. The heat is absorbed by the refrigerant fluid changing its state in a first portion of the evaporator to a saturated vapor of higher enthalphy. As the refrigerant flows through the remaining portion of the evaporator heat exchanger, it becomes superheated, and increases in enthalpy as it reaches the heat exchanger outlet.

The super-heated hot gas leaves the evaporator and is directed across an electric generator. As the super-heated refrigerant hot gas flows across the electrical generator, it absorbs the heat energy dissipated from the generator, further increasing the refrigerant gas temperature and enthalpy. At this point in the cycle or circuit, the extra super-heated refrigerant gas containing high enthalpy leaves the generator and approaches turbine nozzles at a relatively low velocity. The gas flows through the nozzles and enters a region of low pressure. The flow of gas is in the form of a jet column of high-speed molecules. The nozzles are placed at a sharp angle to the turbine wheel. The high speed molecules are directed to a selected area of the turbine blades and expand as they flow through passages between the blades. By keeping the tangential speed of the blades slower than the jet stream, the jet stream turns, exiting in an axial direction and at a lower speed than that with which it entered the blades. This change in the momentum of the molecules releases most of the kinetic energy of the molecules which works on the blades as a force. This force, made by converting a steady, continuous flow of high-enthalpy gas, drives the shaft of the turbine wheel and the generator in a steady rotating motion. The refrigerant is now at a low pressure, low temperature and slightly lower enthalpy as it leaves the turbine and enters a condenser.

In the condenser heat exchanger, heat is removed from the refrigerant by providing a medium at a lower temperature to which the heat can flow and be dissipated. The heat-removal process lowers the enthalpy of the refrigerant until it reaches the saturation point at the pressure existing in the condenser heat exchanger. Further removal of heat affects a change of state and condenses the refrigerant into a liquid, lowering its temperature and enthalpy. The refrigerant liquid returns to the receiver tank, completing the loop of the system.

The temperature of the medium (air, water, etc.) which removes heat from the condenser's refrigerant establishes the temperature at which condensation takes place. As it takes on heat from the refrigerant, the temperature of the medium will rise. To maintain the flow of heat, the temperature of the refrigerant in the condenser is above the temperature of the medium.

For some refrigerants, a means for drawing refrigerant vapor from the turbine discharge chamber into the condenser heat exchanger is required. This is accomplished by mounting a second set of blades downstream on the turbine shaft in the turbine discharge chamber. An adjustable pressure sensing device is installed in the turbine discharge chamber so that the pressure in the chamber is controlled to allow a smooth, regular turbine speed. The pressure sensing device monitors the pressure at points upstream and downstream of the first set of turbine blades. The sensing device adjusts the blade pitch of the second set of blades to maintain the desired pressure setting.

Briefly, a second system of the present invention is directed to a new and further-improved refrigeration system and method of refrigeration with an enormously increased capacity. The refrigeration system of the present invention includes a turbine, pump, condenser, evaporators and compressor all in a gas-tight, closed piping loop through which flows a refrigerant. Any refrigerant may be used in these systems, such as chlorodifluoromethane, R-22. An evaporator heat exchanger with an inlet and an outlet is included in the loop. A flow control valve is positioned in the inlet of the evaporator heat exchanger and is controlled by a sensing device at the outlet of the evaporator heat exchanger. Refrigerant fluid flows into the evaporator heat exchanger in a liquid or near-liquid state at a pressure higher than the pressure setting of the sensing device located in the heat exchanger outlet. Heat is transferred through the walls of the evaporator heat exchanger from a surrounding higher temperature medium and is absorbed by the refrigerant fluid, changing its state in a first portion of the evaporator heat exchanger to a saturated vapor of higher enthalpy. As the refrigerant flows through the remaining portion of the evaporator heat exchanger, it becomes super heated, gaining additional enthalpy as it reaches the heat exchanger outlet. As the super-heated refrigerant gas leaves the evaporator heat exchanger, it enters the suction inlet of a compressor. The pressure and temperature of the refrigerant is reduced at a constant enthalpy during this transfer. The compressor increases enthalpy, pressure and temperature of the refrigerant by "the heat of compression" providing "hot gas." This hot gas exits the compressor and is directed across a motor. The refrigerant absorbs additional heat from heat dissipated from the motor, further increasing the temperature of the refrigerant and its enthalpy, resulting in a super-heated hot gas. The super-heated refrigerant gas leaves the motor and enters the flash tank.

The super-heated hot gas leaves the flash tank and is directed across an electric generator. As the super-heated refrigerant hot gas flows across the electric generator, it absorbs the heat energy dissipated from the generator, further increasing the refrigerant gas temperature and enthalpy. At this point in the cycle or circuit, the extra-super-heated, high enthalpy refrigerant gas leaves the generator and approaches turbine nozzles at a relatively low velocity. The gas flows through the nozzles and enters a region of lower pressure. The flow of gas is in the form of a jet column of high-speed molecules. The nozzles are placed at a sharp angle to the turbine wheel. The high-speed molecules are directed to a selected area of the turbine blades and expand as they flow through passages between the blades. By keeping the tangential speed of the blades slower than the jet stream, the jet stream turns, exiting in an axial direction and at a lower speed than that with which it entered the blades. This change in momentum of the molecules releases most of the kinetic energy of the molecules which works on the blades as a force. This force, made by converting a steady, continuous flow of high enthalpy gas, drives the shaft of the turbine wheel and the generator in a steady rotating motion. The refrigerant is now at a low pressure, low temperature and slightly lower enthalpy as it leaves the turbine and enters a condenser.

In the condenser heat exchanger, heat is removed from the refrigerant by providing a medium at a lower temperature to which the heat can flow and be dissipated. The heat removal process lowers the temperature of the refrigerant until it reaches the saturation point at the pressure existing in the condenser heat exchanger. Further removal of the heat affects a change of state and condenses the refrigerant into a liquid, lowering its temperature and enthalpy. The refrigerant liquid returns to the receiver tank.

The temperature of the medium (air, water, etc.) which removes heat from the condenser refrigerant establishes the temperature at which condensation takes place. As it takes on heat from the refrigerant, the temperature of the medium will rise. To maintain the flow of heat, the temperature of the refrigerant in the condenser is above the temperature of the medium.

The receiver tank stores the system's liquid refrigerant. The suction side of the refrigerant pump is connected to the outlet side of the receiver tank. The refrigerant pump draws the low temperature, low enthalpy saturated liquid refrigerant from the receiver tank and feeds an evaporator inlet tube at high pressure. Heat is then transferred through the walls of the evaporator heat exchanger from the medium to be cooled which has a higher temperature. The heat is absorbed by the refrigerant liquid, changing its state in a first portion of the evaporator to a saturated vapor of high enthalpy. The refrigerant flows through the remaining portion of the evaporator heat exchanger outlet and enters the flash tank to complete the last circuit of the system.

For some refrigerants, a means for drawing refrigerant vapor from the turbine discharge chamber into the condenser heat exchanger is required. This is accomplished by mounting a second set of blades downstream on the turbine shaft in the turbine discharge chamber. An adjustable pressure sensing device is installed in the turbine discharge chamber so that the pressure in the chamber is controlled to allow a smooth, regular turbine speed. The pressure sensing device monitors the pressure at points upstream and downstream of the first set of turbine blades. The sensing device adjusts the blade pitch of the second set of blades to maintain the desired pressure setting.

Briefly, a third system of the present invention is directed to a new and still-further-improved refrigeration system and a method of refrigeration without the use of a condenser to dissipate excess heat from the source.

The refrigeration system of the present invention includes two refrigeraton circuits. The refrigerant present in each circuit may be independently selected as any refrigerant, such as chlorodifluoromethane, R-22.

Circuit one includes a compressor which produces refrigerant flow through the compressor motor, through two heat exchangers, and back to the suction end of the compressor to complete a gas-tight, closed piping loop of the compressor circuit.

Circuit two includes a pump which produces the refrigerant flow through the second heat exchanger, through a third heat exchanger, through an electric generator, through a gas turbine, through the first heat exchanger, into a receiver tank, through the pump motor, and to the suction end of the pump to complete a gas-tight, closed piping loop of the pump circuit.

In the compressor circuit, a flow control valve is positioned in the inlet of the first evaporator heat exchanger and is controlled by a sensing device at the outlet tube of the evaporator heat exchanger. Refrigerant fluid flows into the first evaporator heat exchanger in a liquid or near-liquid state at a pressure higher than the pressure setting of the sensing device located in the heat exchanger outlet. Heat is transferred through the walls of the evaporator heat exchanger from the surrounding higher temperature of the pumped condensing refrigerant. This heat is absorbed by the compressor evaporating refrigerant fluid, changing its state in the first portion of the evaporator to a saturated vapor of higher enthalpy. As the compressor's refrigerant flows through the remaining portion of the heat exchanger, it becomes super heated, gaining additional enthalpy as it reaches the first heat exchanger outlet.

The super-heated refrigerant gas leaves the first evaporator heat exchanger and enters the suction inlet of the compressor. Before compressing the refrigerant gas, the gas is directed across the compressor's motor. The refrigerant gas absorbs additional heat rejected from the motor, further increasing the temperature of the refrigerant and its enthalpy. The compressor increases the enthalpy, pressure and temperature by "the heat of compression" providing "hot gas." The hot gas leaves the compressor and enters the inlet pipe of the second heat exchanger. Heat is removed from the hot gas as it flows through the walls into the evaporating pumped refrigerant gas inside. The second heat exchanger removes the heat taken on by the compressor refrigerant in the first evaporator heat exchanger, compressor motor heat, and the compressor's "heat of compression." The heat removal process lowers the temperature of the hot gas until it reaches the saturation point. Further removal of the heat affects a change of state and condenses the refrigerant gas to a liquid so that it can be used over again. The heat exchanger is sized large enough so that the hot gas is cooled to a temperature below that which is condensed into a liquid. The refrigerant liquid, now at a low pressure, temperature and enthalpy, enters the inlet side of the first evaporator heat exchanger to complete the compressor's refrigerant circuit.

The receiver tank stores the pump system's liquid refrigerant. The suction side of the refrigerant pump is connected to the outlet side of the receiver tank. The refrigerant pump draws the liquid refrigerant from the receiver tank and feeds the second evaporator heat exchanger inlet tube at high pressure. Heat is transferred through the walls of this heat exchanger from the surrounding higher temperature refrigerant off the discharge of the compressor, and is absorbed by the pump's refrigerant, changing its state to a saturated vapor of higher enthalpy. As it reaches the heat exchanger outlet, the pumped refrigerant leaves the second heat exchanger and enters the third heat exchanger. Here the refrigerant absorbs heat from the surrounding higher temperature medium, raising the refrigerant's temperature and enthalpy to a super-heated hot gas state while cooling the medium fluid.

The super-heated hot gas leaves the third heat exchanger and is directed across an electric generator. As the super-heated refrigerant hot gas flows across the electric generator, it absorbs the heat energy dissipated from the generator, further increasing the refrigerant gas's temperature and enthalpy. At this point in the cycle or circuit, the extra-super-heated, high enthalpy refrigerant gas leaves the generator and approaches the turbine nozzles at a relatively low velocity. The gas flows through the nozzles and enters a region of lower pressure. The flow of gas is in the form of a jet column of high-speed molecules. The nozzles are placed at a sharp angle to the turbine wheel. The high-speed molecules are directed to a selected area of the turbine blades and expand as they flow through passages between the blades. By keeping the tangential speed of the blades slower than the jet stream, the jet stream turns, exiting in an axial direction and at a lower speed than that with which it entered the blades. This change in the momentum of the molecules releases most of the kinetic energy of the molecules which works on the blades as a force. This force, made by converting a steady, continuous flow of high-enthalpy gas, drives the shaft of the turbine wheel and the generator in a steady rotating motion. The refrigerant is now at a low pressure, low temperature and slightly lower enthalpy as it leaves the turbine and enters the inlet connection of the first heat exchanger.

Heat is removed from the refrigerant gas as it flows inside the first heat exchanger transferring its heat through the walls into the evaporating compressor's refrigerant gas. This lowers the enthalpy of the pump's refrigerant enough to change the pump's refrigerant state from a saturated vapor to a liquid before leaving the first heat exchanger and entering the receiver tank to complete the pump's refrigerant circuit.

For some refrigerants, a means for drawing refrigerant vapor from the turbine discharge chamber into the first heat exchanger is required. This is accomplished by mounting a second set of blades downstream on the turbine shaft in the turbine discharge chamber. An adjustable pressure sensing device is installed in the turbine discharge chamber so that the pressure in the chamber is controlled to allow a smooth, regular turbine speed. The pressure sensing device monitors the pressure at points upstream and downstream of the first set of turbine blades. The sensing device adjusts the blade pitch of the second set of blades to maintain the desired pressure setting.

BRIEF DESCRIPTION OF THE DRAWINGS

The objects, advantages and novel features of the present invention will become apparent from the following detailed description of a preferred embodiment of the invention illustrated in the accompanying drawings within.

DESCRIPTION OF PREFERRED EMBODIMENT

Figure 1:
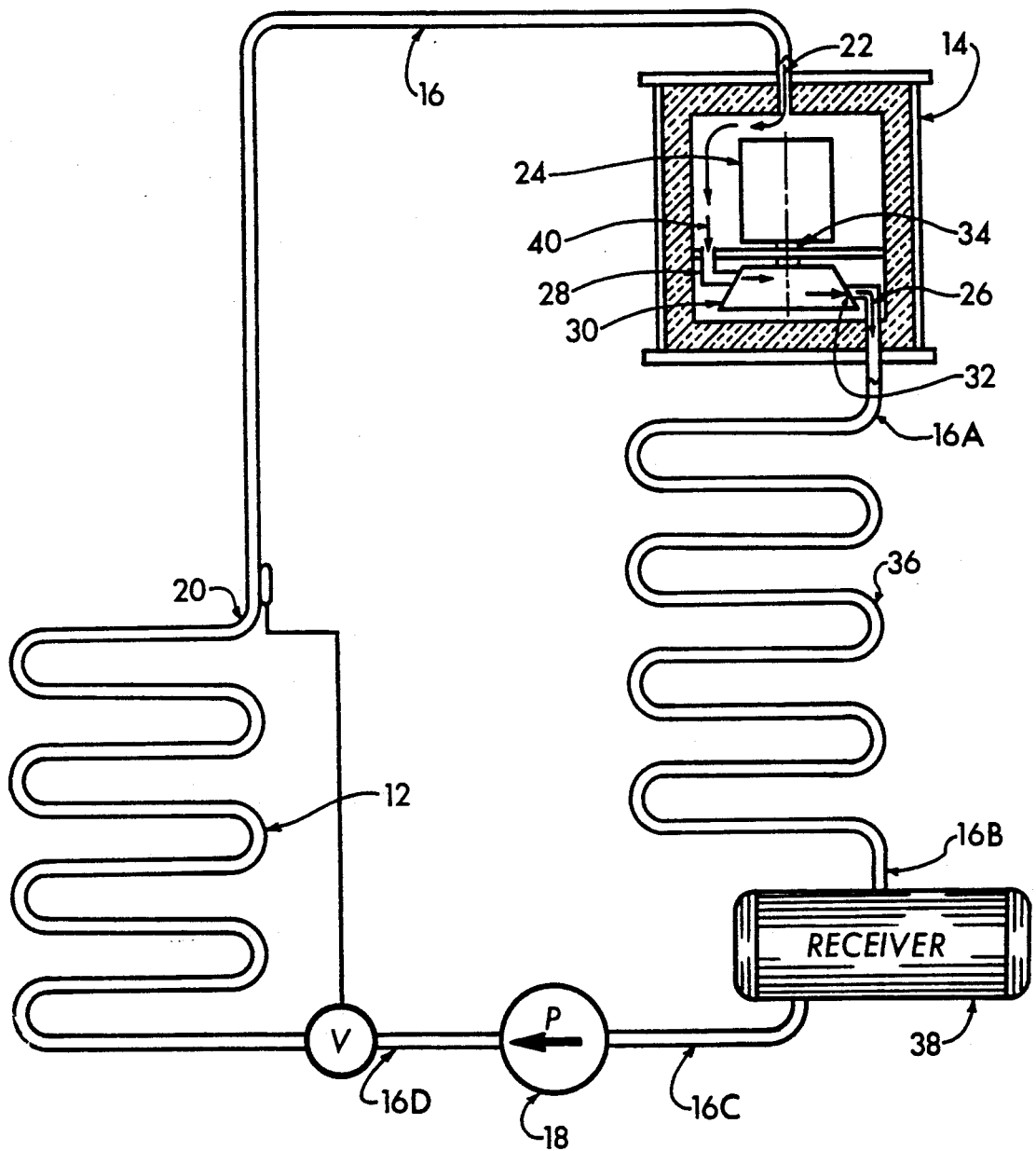
FIG. 1 is a schematic illustration of Refrigeration System 1 including the components assembled and constructed in accordance with the principles of the present invention.

Referring to the drawings, FIG. 1 illustrates a refrigeration system comprising a closed loop containing a pump 18, a heat exchanger 12, a housing 14 containing a turbine-driven electrical generator 24, a second heat exchanger 36, and a receiver tank 38. The components and operation of the refrigeration system can best be understood through a description of the flow of refrigerant fluid through the closed loop.

The totally-enclosed pump 18 draws low pressure, low temperature refrigerant fluid from the receiver 38 through piping 16C. The pump pressurizes the refrigerant fluid in piping 16D. As said refrigerant fluid flows through the heat exchanger 12, heat is transferred through the walls of the heat exchanger 12 from the medium in which the heat exchanger 12 is located. This heat is absorbed by the refrigerant fluid. This absorbed heat changes the state of the refrigerant fluid as it flows through the heat exchanger 12, evaporating the fluid into a saturated vapor of a higher enthalpy. As this change occurs, the refrigerant flows through the remaining portion of the heat exchanger 12 toward the outlet 20. It has absorbed sufficient heat to become super heated with a higher enthalpy.

Upon leaving the heat exchanger 12, the super-heated hot gas 22 flows through piping 16 to housing 14 and across the electrical generator 24, absorbing heat energy dissipated from the generator 24 and increasing the refrigerant gas temperature and enthalpy. Generator 24 is a source of portable electric energy which can be used to power all types of vehicles and equipment. For example, it may be used to produce electrical power for heating, cooling, lighting, and any other electrical needs for homes, buildings and industry.

The gas 40, leaving the generator 24, is extra-super-heated gas. This extra-super-heated gas 40 is at a relatively low velocity as it approaches and enters turbine nozzles 28. The refrigerant gas, upon passing through the nozzles 28, moves into a region of lower pressure. In this portion of the circuit, the refrigerant gas is flowing as a jet column of high-speed molecules. The nozzles 28 are aligned at a sharp angle to a turbine wheel 30 and direct the gas molecules to a preselected area on turbine blades 32 and then out through piping 16A. As the gas flows between the blades 32, it expands. By keeping the tangential speeds of the blades 32 slower than the speed of the gas molecules, the jet stream of the gas turns such that it leaves the turbine blades 32 in a generally axial direction and at a lower speed than that with which it entered the blades 32. The momentum of the molecules is reduced by this change in speed, resulting in a release of most of the kinetic energy. This energy transforms into a force action on the blades 32 to drive a common shaft 34 of the turbine wheel 30 and the generator 24 in a steady rotating motion. The low pressure, low temperature and low enthalpy refrigerant 26 leaves the turbine blades 32 and flows through piping 16A to the condenser heat exchanger 36.

As the refrigerant fluid flows through the condenser heat exchanger 36, heat is transferred through the walls of the condenser heat exchanger 36 from the refrigerant to the medium in which the heat exchanger 36 is located. This heat is removed from the refrigerant and is absorbed into the lower temperature medium. The heat removal process lowers the enthalpy of the refrigerant until it condenses to a liquid through a change of state.

The liquid refrigerant having a low pressure, low temperature and low enthalpy flows through piping 16B to the receiver tank 38. The suction end of the refrigerant pump 18 draws liquid refrigerant from the receiver tank 38 through the piping 16C and pressurizes the refrigerant flow in piping 16D to begin the cycle again.

The refrigeration system, designated by the reference number FIG. 1, may include a piston or other rotary machine or a turbine. A turbine is preferred due to its simplicity and dependable, continuous operation at almost any speed. In a gas-reciprocating engine, for example, gas internal energy is converted into shaft work through the work of gas molecules on a moving piston. In contrast, turbines employ nozzles that direct the flow of gas in the same direction, forming high speed gas jets. A turbine, as provided in the present invention, is desirable for use in refrigeration system, since turbines can be designed with a high level of accuracy due to the fact that the properties of gases are well known at all pressures and temperatures. The turbine, defined by the generator 24, turbine nozzles 28, turbine wheel 30 and turbine blades 32 and used in the refrigeration system, can be a single blade or a multi-blade, multi-stage turbine depending on the efficiency and horsepower to be developed. An example of a turbine that may be used if it were leak proof and designed for freon, is Model RL-12L, now designed for steam sold by Corpus Engineering Corporation of Worcester, Mass. The present invention uses a turbine at constant entropy to reduce the temperature and pressure of the super-heated refrigerant gas, resulting in saturated vapor with less enthalpy.

The fluid medium flowing around the evaporator heat exchanger 12 releases its heat energy to the refrigerant flowing through the evaporator. The refrigerant enters as a cold liquid in a completely saturated state and exits the evaporator as a super-heated gas. In order to make full use of the evaporator, the refrigerant must absorb sufficient heat from the medium allowing all the refrigerant to evaporate into a super-heated state. This change of state is possible because heat is picked up in the evaporator heat exchanger from the refrigeration load. The operation to accomplish this change of state is designated by those skilled in the art as the refrigeration effect and is the difference between the enthalpy entering and the enthalpy leaving the evaporator heat exchanger.

Figure 2:
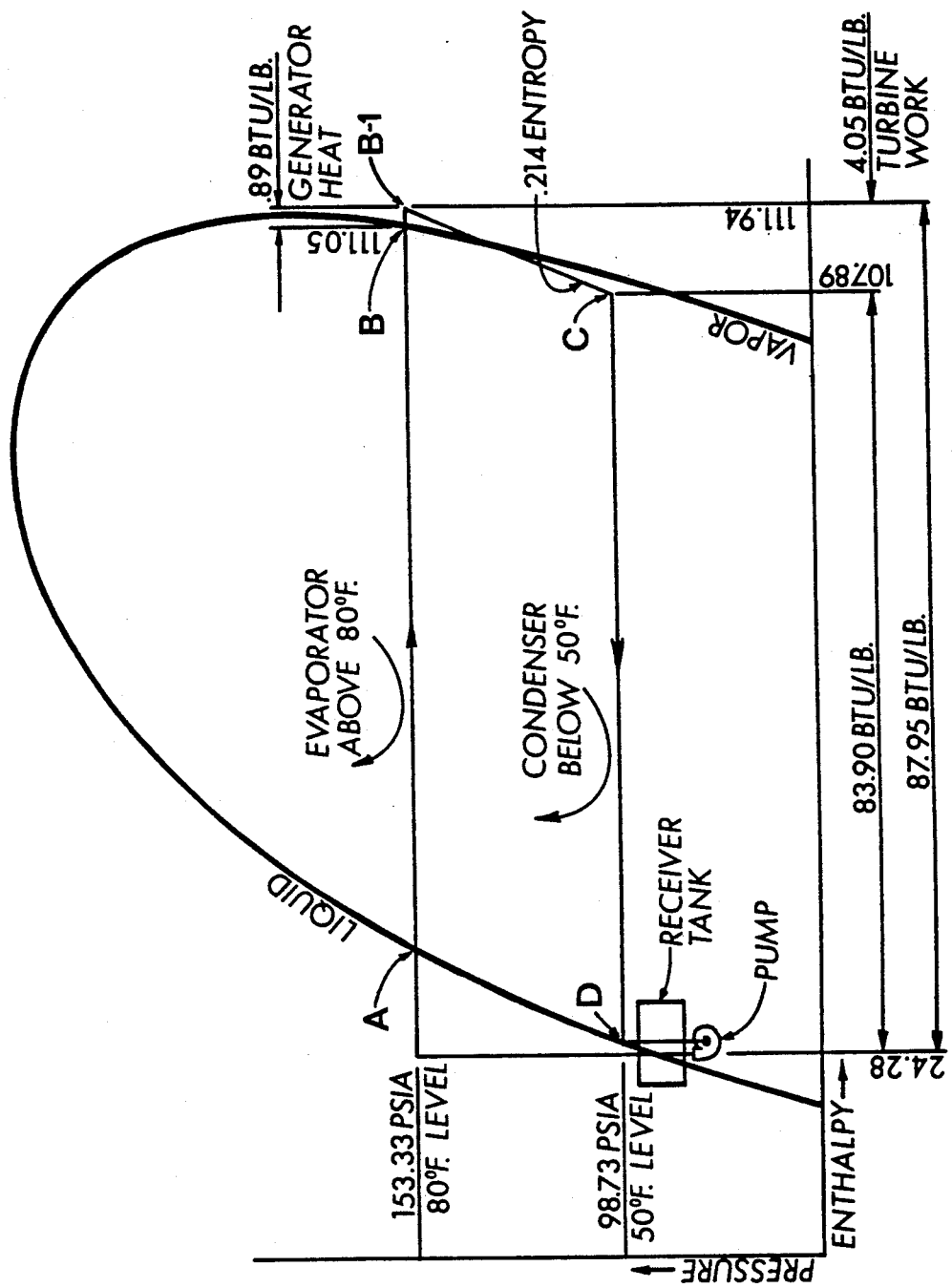
FIG. 2 is a graph illustrating the different pressure and enthalpy levels for refrigerant as it flows through the system schematically illustrated in FIG. 1.

An illustrative example of flow through Refrigeration System 1, as shown in FIG. 2, is as follows. In this example, the refrigerant is chlorodifluoromethane, R-22, a safe, hydrocarbon compound commonly used for air conditioning. The fluid medium flowing across the evaporator heat exchanger 12 is air above 80 degrees Fahrenheit. The refrigerant enters the evaporator heat exchanger 12 at 50 degrees Fahrenheit, 153.33 PSIA pressure with an enthalpy of 24.28 BTU/LB. As the refrigerant flows through the evaporator heat exchanger 12, it boils at 80 degrees Fahrenheit to a saturated vapor at 80 degrees Fahrenheit with an enthalpy of 111.50 BTU/LB.

From the evaporator heat exchanger 12, the refrigerant then flows across the generator 24. As the refrigerant flows across the generator 24, its temperature should rise to approximately 82 degrees Fahrenheit with its enthalpy raised to 111.91 BTU/LB at the same pressure of 153.33 PSIA. This results in the extra-super-heated gas 40 that is directed to the turbine nozzles 28 across the turbine blades 32.

The above-described example is illustrated graphically in FIG. 2. With reference to FIG. 2, the state of the refrigerant upon entering the evaporator heat exchanger 12 is indicated by point A in the graph. At point A, the refrigerant is at 50 degrees Fahrenheit temperature, 153.33 PSIA pressure and an enthalpy of 24.28 BTU/LB. As the refrigerant flows through the evaporator heat exchanger 12, it boils at 80 degrees Fahrenheit and a pressure of 153.33 PSIA with an enthalpy of 111.05 BTU/LB as indicated by point B on the graph. As previously described and as illustrated in the graph, the change in state from point A to point B is the refrigeration effect provided by the evaporator heat exchanger 12. As the refrigerant then flows across the generator, the refrigerant becomes super-heated to 82 degrees Fahrenheit with an enthalpy of 111.94 BTU/LB as indicated by point B-1 in the graph.

The next step is passing the refrigerant through the turbine wheel 30 and turbine blades 32 so to effect the turbine blades 32, and the turbine, dropping the refrigerant's pressure to 98.73 PSIA and temperature of 50 degrees Fahrenheit along the 0.214 BTU/LB-R entropy direction as indicated by point C on FIG. 2.

At point C, the refrigerant is at 50 degrees Fahrenheit temperature, 98.73 PSIA pressure and an enthalpy of 107.89 BTU/LA. As the refrigerant flows through the condenser heat exchanger 36, it condenses at 50 degrees Fahrenheit and a pressure of 98.73 PSIA. The refrigerant changes its state to a liquid with an enthalpy of 24.28 BTU/LB as indicated by point D in the graph. As previously described and as illustrated in the figure, the change in state from point C to point D is the condensing effect provided by the condenser heat exchanger 36.

The liquid refrigerant is then sent to receiver tank 38 where it is collected and stored at 98.73 PSIA, 50 degrees Fahrenheit and at an enthalpy of 24.28 BTU/LB before entering the suction end of pump 18. The pump 18 discharge pressure of 153.33 PSIA supplies the liquid refrigerant to the inlet of the evaporator heat exchanger 12 as indicated from point D to point A in FIG. 2. At point A the cycle may be repeated.

Figure 3:
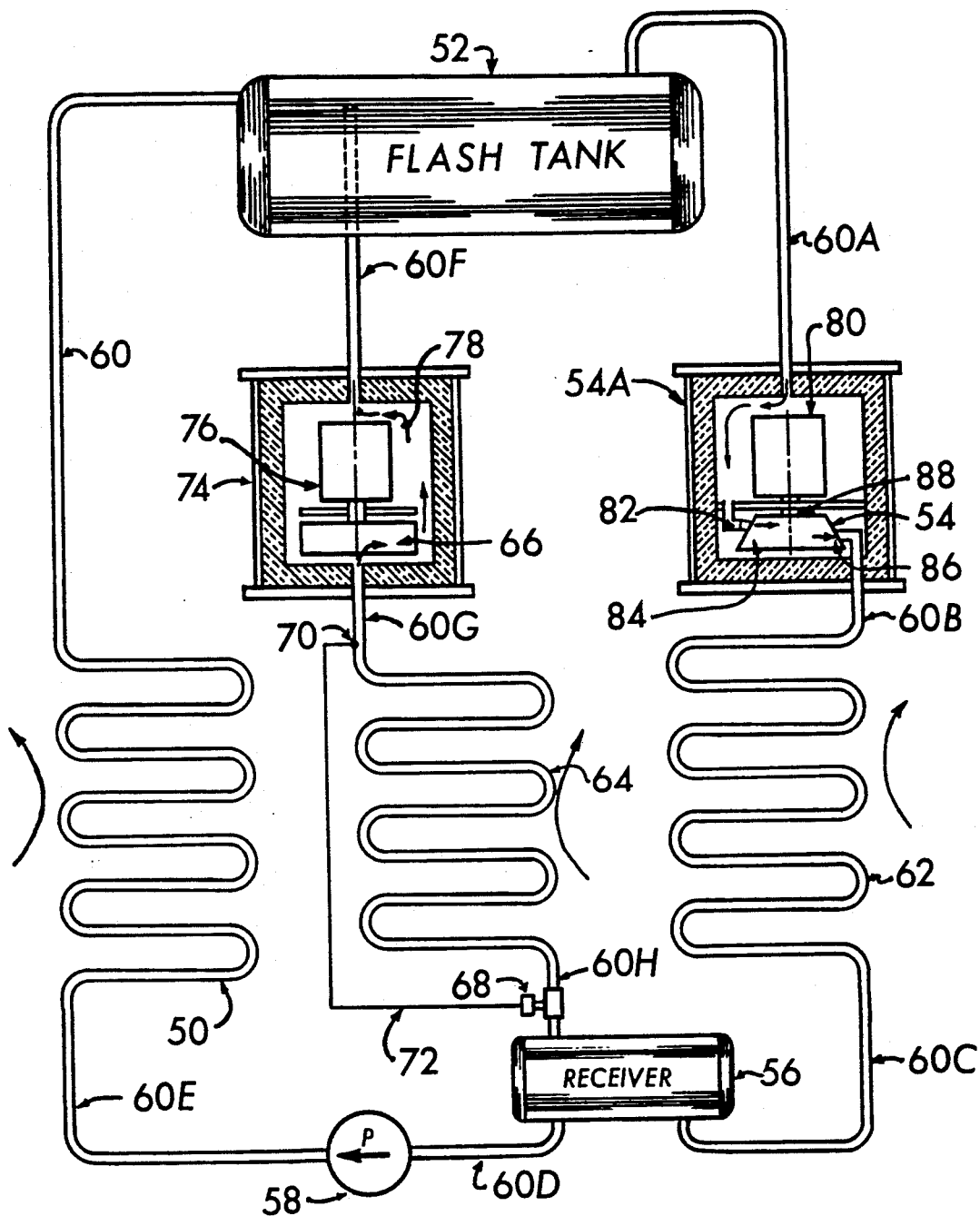
FIG. 3 is a schematic illustration of Refrigeration System 2 including the components assembled and constructed in accordance with the principles of the present invention.

Referring to the drawings, there is illustrated Refrigeration System 2, generally designated by the reference number of FIG. 3. The refrigeration system includes a cooling heat exchanger 50, a flash tank 52, a totally-enclosed turbine generator 54A, a condenser heat exchanger 62, a totally-enclosed compressor 74, an evaporator heat exchanger 64, a receiver tank 56, and a totally-enclosed pump 58 which are components in a closed loop defined by a piping system interconnected by piping 60. The components and operation of the flow in the refrigeration system can best be understood through a description of refrigerant fluid flow through the closed loop of piping 60 and its components.

In the present invention, refrigerant fluid in a liquid state having a low pressure, low temperature and low enthalpy is stored in a receiver tank 56. The totally-enclosed pump 58 draws the liquid refrigerant from the receiver tank 56 through piping 60D. Pump 58 produces a high-pressure refrigerant flow through piping 60E to the cooling evaporator heat exchanger 50. As refrigerant fluid through the cooling heat exchanger 50, heat is transferred through the walls from the medium in which the heat exchanger 50 is located, thus cooling the medium. This heat is absorbed by the refrigerant fluid and changes the state of the refrigerant fluid as it flows through the heat exchanger 50, evaporating the fluid into a saturated vapor of a higher enthalpy. As this change occurs, the refrigerant flows through the remaining portion of the heat exchanger 50 toward the end outlet piping 60. As the refrigerant approaches the outlet piping 60, it has absorbed sufficient heat to become super heated with a higher enthalpy. Upon exiting through the outlet piping 60 of the heat exchanger 50, the refrigerant is a super-heated refrigerant gas than then enters a flash tank 52.

Compressor 66 also draws the low enthalpy liquid refrigerant from the receiver tank 56, producing flow through piping 60H, through the evaporator heat exchanger 64, and through piping 66G. When the refrigerant reaches the end of the piping 60H, a meeting device 68, such as a flow control valve, regulates the rate of flow into the heat exchanger 64 in proportion to the load. Sensing element 70 senses the condition of the refrigerant leaving the heat exchanger 64, thereby measuring the amount of super-heated refrigerant leaving the heat exchanger 64. Sensing element 70, connected to tube 72, controls the refrigerant's flow through the control valve 68 in order to maintain a predetermined amount of super-heated gas.

As refrigerant liquid flows through the heat exchanger 64, heat is transferred through the walls from the medium in which the heat exchanger 64 is located, thus cooling the medium. This heat is absorbed by the refrigerant liquid and changes the state of the refrigerant fluid as it flows through the heat exchanger 64, evaporating the fluid into a saturated vapor of a higher enthalpy. As this change occurs, the refrigerant flows through the remaining portion of the heat exchanger 64 toward the outlet 60G. As the refrigerant approaches the outlet 60G, it has absorbed sufficient heat to become super heated with a higher enthalpy.

Upon exiting through the outlet 60G of the heat exchanger 64, the refrigerant is a super-heated refrigerant gas that enters an inlet of the compressor 66, which is located within the housing or shell 74. The compressor 66 functions to pull off refrigerant vapor as rapidly as it is formed, thereby maintaining the proper pressure, saturation and boiling temperature in the heat exchanger 64. The compressor 66 compresses the refrigerant fluid. This work increases the refrigerant fluid's pressure, temperature and enthalpy. This is called the "heat of compression." The refrigerant exiting the compressor is in a state known as "hot gas".

In the present invention, this hot gas is directed to flow across the compressor motor 76 mounted within the housing or shell 74 downstream of the compressor 66. The motor 76 powers the compressor 66. The dissipated heat from motor 76 is absorbed by the refrigerant fluid as it flows across the motor 76. The temperature and enthalpy of the refrigerant gas is further increased by this dissipated heat, resulting in a super-heated hot gas 78.

Upon leaving the motor 76, the super-heated hot gas 78 flows through piping 60F and enters a flash tank 52. In the flash tank 52, the super-heated hot gas from the pump circuit piping 60 and the compressor circuit piping 60F combine, equalizing the pressure, temperature and enthalpy of the refrigerant gas. The combined super-heated hot gas exits the flash tank 52, flowing through piping 60A to housing 54A and across an electric generator 80, absorbing energy heat energy from the generator 80, and increasing the refrigerant gas temperature and enthalpy.

The gas 78 leaving the generator 80 is extra-super-heated gas. This extra-super-heated gas 78 is at a relatively low velocity as it approaches and enters turbine nozzles 82. This refrigerant gas, upon passing through the nozzles 82 moves into a region of lower pressure. In this portion of the circuit, the refrigerant gas is flowing as a jet column of high speed molecules. The nozzles 82 are aligned at a sharp angle to a turbine wheel 84 and direct the gas molecules to a preselected area on the turbine blades 86 and then out through piping 60B. As the gas flows between the blades 86, it expands. By keeping the tangential speeds of the blades 86 slower than the speed of the gas molecules, the jet stream of the gas turns such that it leaves the turbine blades 86 in a generally axial direction and at a lower speed than that with which it entered the blades 86. The momentum of the molecules is reduced by this change in speed resulting in a release of most of the kinetic energy of the gas. This released kinetic energy is transformed into a force acting on the blades 86 to drive a common shaft of the turbine wheel 84 and the generator 80 in a steady rotating motion.

The low pressure, low temperature and low enthalpy refrigerant leaves the turbine blades 86 and flows through piping 60B to the condenser heat exchanger 62.

As the refrigerant fluid flows through the condenser heat exchanger 62, heat is transferred through the walls of the heat exchanger 62 from the refrigerant to the medium in which the heat exchanger 62 is located. This heat is removed from the refrigerant and is absorbed into the lower temperature medium. The heat removal process lowers the enthalpy of the refrigerant until it condenses to a liquid through a change of state.

The liquid refrigerant having low pressure, low temperature and low enthalpy flows through piping 60C to the receiver tank 56. The suction end of the refrigerant pump 58 draws liquid refrigerant from the receiver tank 56 through the piping 60D and pressurizes the refrigerant in piping 60E to begin the cycle again.

Figure 4:
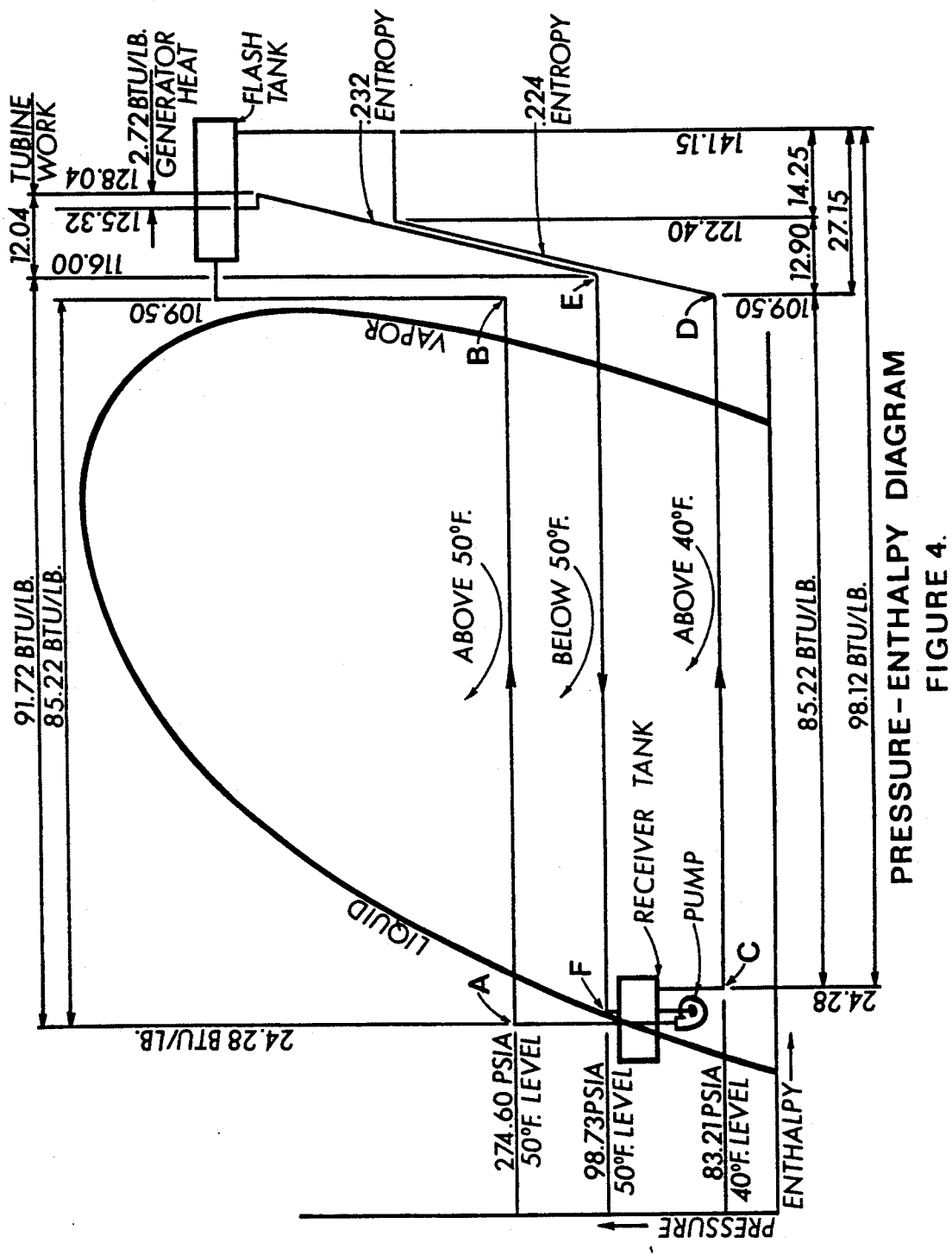
FIG. 4 is a graph illustrating the different pressure and enthalpy levels for refrigerant as it flows through the system schematically illustrated in FIG. 3.

An illustrative example of flow through Refrigeration System 2 as shown in FIG. 4 is as follows. In this example, chlorodifluormethane refrigerant is utilized. The refrigerant cooled pump 58 draws liquid refrigerant from the receiver tank 56 and provides refrigerant flow through the evaporator heat exchanger 50. The fluid medium flowing across the evaporator heat exchanger 50 is air above 50 degrees Fahrenheit, dry bulb. The refrigerant enters the evaporator heat exchanger 50 at 50 Fahrenheit, 274.60 PSIA pressure with an enthalpy of 24.28 BTU/LB at point A. As the refrigerant flows through the heat exchanger 50, it boils at 50 degrees Fahrenheit to a saturated vapor and becomes super heated at 50 degrees Fahrenheit with an enthalpy of 109.50 BTU/LB. From the heat exchanger 50 at point B, the refrigerant enters the flash tank.

The compressor 66 draws refrigerant from the receiver tank 56 at 50 degrees Fahrenheit and 98.73 PSIA pressure. The sensing device or sensing element 70 at the outlet of the evaporator heat exchanger 64 is set at 83.21 PSIA, allowing the refrigerant to flow through the control valve 68 and into the heat exchanger 64. As the refrigerant flows through the heat exchanger 64 from point C, it boils at 40 degrees Fahrenheit to a saturated vapor and becomes super heated at 40 degrees Fahrenheit with an enthalpy of 109.50 BTU/LB at point D.

From the heat exchanger 64, the refrigerant enters the compressor 66, and the heat of compression raises the temperature of the refrigerant to approximately 170 degrees Fahrenheit saturated temperature with pressure of 274.60 PSIA and an enthalpy of 122.40 BTU/LB. The refrigerant then flows over the compressor motor 76 and the temperature of the refrigerant is raised to approximately 252 degrees Fahrenheit with an enthalpy of 141.15 BTU/LB at the same pressure of 274.60 PSIA. Having flowed over the motor 76, the refrigerant then flows into the flash tank 52.

The refrigerant from the pump 58 and compressor 66 combine in the flash tank 52, resulting in a refrigerant gas having a temperature of approximately 180 degrees Fahrenheit, pressure at 274.60 PSIA with an enthalpy of 125.32 BTU/LB. The refrigerant exits the flash tank 52 and enters the turbine generator 54A. The refrigerant then flows across the generator 80. As the refrigerant flows across the generator 80, its temperature should rise to approximately 190 degrees Fahrenheit with its enthalpy raised to 128.04 BTU/LB at the same pressure of 274.60 PSIA. This results in the extra-super-heated gas that is directed by the turbine nozzles 82 across the turbine blades 86. At an entropy of 0.232 BTU/LB-R, the refrigerant gas temperature drops to 80 degrees Fahrenheit, pressure drops to 98.73 PSIA, and its enthalpy drops down to 116.00 BTU/LB as indicated at point E.

The refrigerant in a super-heated state leaves point E and flows to point F through a condenser heat exchanger 62. The fluid medium flowing across the heat exchanger 62 is air below 50 degrees Fahrenheit. The refrigerant enters the heat exchanger 62 at 50 degrees Fahrenheit, 98.73 PSIA pressure with an enthalpy of 116.00 BTU/LB. As the refrigerant flows through the heat exchanger 62, it condenses to a liquid at 50 degrees Fahrenheit with an enthalpy of 24.28 BTU/LB. From the heat exchanger 62 at point F, the refrigerant enters the receiver tank to complete the cycle.

The normal total effect of the evaporator or refrigeration effect is about 65 BTU/LB of enthalpy. The present invention uses two evaporators. The pumped circuit produces 85.22 BTU/LB of enthalpy as indicated by point A to point B on FIG. 4. The compressor circuit produces 85.22 BTU/LB of enthalpy as indicated by point C to point D on FIG. 4. Together the two evaporators total 170.44 BTU/LB using approximately the same amount of energy as prior art. The compressor, together with the pump, uses approximately 15.00 BTU/LB, less than the normal amount of energy of almost 16.00 BTU/LB as in prior art which has a refrigeration effect of less than 65 BTU/LB. By passing the refrigerant through the turbine wheel and turbine blades, the effect of the turbine, indicated on FIG. 4, from the flash tank outlet to point E has an energy gain of 12.04 BTU/LB. At this point, the flow is doubled because the pumped circuit and the compressor circuit provide an energy gain of 24.08 BTU/LB.

Figure 5:
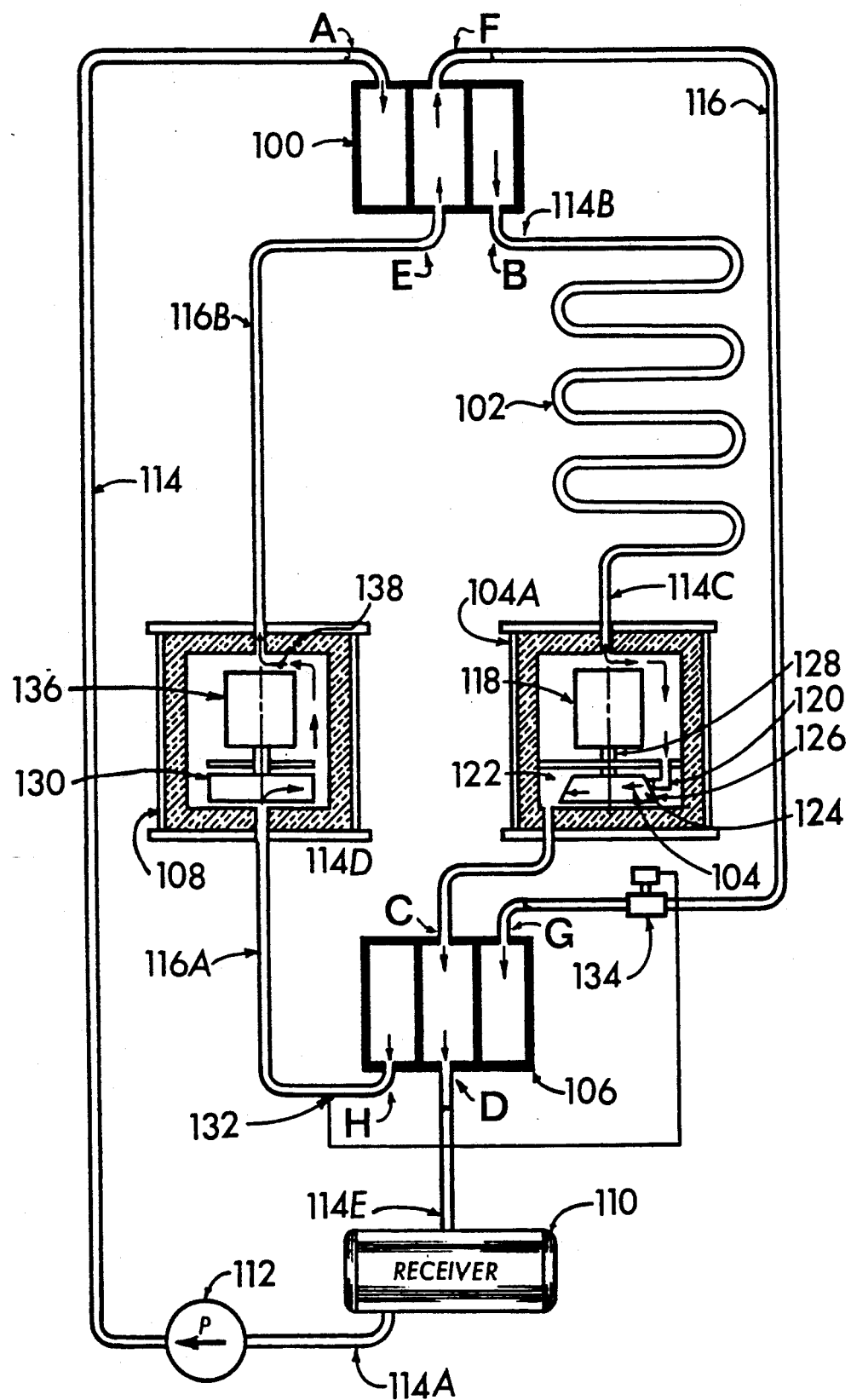
FIG. 5 is a schematic illustration of Refrigeration System 3 including the components assembled and constructed in accordance with the principles of the present invention.

Referring to the drawings, there is illustrated Refrigeration System 3, generally designated by the reference number of FIG. 5. This refrigeration system includes a condenser heat exchanger 100, a medium heat exchanger 102, a totally-enclosed turbine generator 104A, an evaporator heat exchanger 106, a receiver tank 110, a totally-enclosed pump 112, and a totally-enclosed compressor 108 which are components in two piping systems interconnected by piping 114 and piping 116. Operation of the refrigeration system can best be understood through a description of refrigerant fluid flow through the closed loop piping 114 and piping 116 and its components.

In the present invention, refrigerant fluid in a liquid state having a low pressure, low temperature and low enthalpy is stored in a receiver tank 110. The totally-enclosed pump 112 draws the liquid refrigerant from the receiver tank 110 through piping 114A. Pump 112 produces a high-pressure refrigerant flow through piping 114 to the cooling evaporator heat exchanger 100. As refrigerant flows through the condenser heat exchanger 100, heat is transferred through the walls from the compressor's hot gas refrigerant, thus cooling the compressor's refrigerant and condensing it to a liquid. This heat is absorbed by the pump's refrigerant, changing the state of the refrigerant fluid as it flows through the heat exchanger 100, evaporating the fluid into a saturated vapor of a higher enthalpy. As this change occurs, the refrigerant flows through the remaining portion of the heat exchanger 100 toward the end of outlet piping 114B. As the refrigerant approaches the outlet piping 114B, it has absorbed sufficient heat to become super heated with a higher enthalpy.

Upon exiting through the outlet piping 114B of the heat exchanger 100, the refrigerant is a super-heated refrigerant gas that enters the heat exchanger 102. Heat is transferred through the walls from the medium in which the heat exchanger 102 is located, thus cooling the medium. The heat absorbed into the refrigerant fluid raises its temperature and enthalpy to a super-heated hot gas state.

The refrigerant leaves the evaporator and is directed across an electrical generator 118. As the super-heated refrigerant hot gas flows across the electric generator 118, it absorbs the heat energy dissipated from generator 118, further increasing the refrigerant gas temperature and enthalpy. At this point in the cycle or circuit, the extra-super-heated refrigerant gas containing high enthalpy leaves the generator 118 and approaches the turbine nozzles 120 at a relatively low velocity. The gas flows through the nozzles 120 and enters a region of lower pressure 122. The flow of gas is in the form of a jet column of high-speed molecules. The nozzles 120 are placed at a sharp angle to the turbine wheel 124. The high-speed molecules are directed to a selected area of the turbine blades 126 and expand as they flow through passages between the blades 126. By keeping the tangential speed of the blades 126 slower than the jet stream, the jet stream turns, exiting in an axial direction and at a lower speed than that with which it entered the blades 126. This change in the momentum of the molecules releases most of the kinetic energy of the molecules which works on the blades 126 as a force. This force, made by converting a steady, continuous stream of high-enthalpy gas, drives the shaft 128 of the turbine wheel 124 and the generator 118 in a steady rotating motion. The refrigerant is now at a low pressure, low temperature and slightly lower enthalpy as it leaves the turbine housing 104A through piping 114D and enters the inlet connected to heat exchanger 106. Heat is removed from the refrigerant gas as it flows inside the heat exchanger 106, transferring its heat through the walls into the evaporating compressor's refrigerant gas. This action lowers the enthalpy of the pump's refrigerant enough to change the pump's refrigerant state from a saturated vapor to a liquid before leaving the heat exchanger 106 through piping 114E to enter the receiver tank 110 to complete the pump's refrigerant circuit.

In the compressor 130 circuit, the flow control valve 134 is positioned in the inlet pipe 116 of the evaporator heat exchanger 106 and is controlled by a sensing device 132 at the outlet pipe 116A of the heat exchanger 106. Refrigerant fluid flows into the heat exchanger 106 in a liquid or near-liquid state at a pressure higher than the pressure setting of the sensing device 132 located at the heat exchanger outlet 116A. Heat is transferred through walls of the heat exchanger 106 from the surrounding higher temperature condensing pump refrigerant. This heat energy is absorbed by the compressor evaporating refrigerant, changing its state in the first portion of the evaporator to a saturated vapor of higher enthalpy. As the compressor's refrigerant flows through the remaining portion of the heat exchanger 106, it becomes super heated, gaining additional enthalpy as it reaches the heat exchanger outlet 116A.

Upon exiting through the outlet piping 116A of the heat exchanger 106, the refrigerant is a super-heated refrigerant gas that enters an inlet of the compressor 130, which is located within the housing or shell 108. The compressor 130 functions to pull off refrigerant vapor as rapidly as it is formed, thereby maintaining the proper pressure, saturation and boiling temperature in the heat exchanger 106. The compressor 130 compresses the refrigerant fluid, thereby increasing the refrigerant fluid's pressure, temperature and enthalpy. This is called "heat of compression." The refrigerant exiting the compressor is in a state known as "hot gas".

In the present invention, this hot gas is directed to flow across the compressor motor 136, mounted within the housing or shell 108 downstream of the compressor 130. The motor 136 powers the compressor 130. The dissipated heat from motor 136 is absorbed by the refrigerant fluid as it flows across the motor 136. The temperature and enthalpy of the refrigerant gas is further increased by this rejected heat, resulting in a super-heated hot gas 138.

Upon leaving the motor 136, the super-heated hot gas 138 flows through piping 116B and enters a condenser heat exchanger 100. As the compressor's refrigerant fluid flows through the condenser heat exchanger 100, heat from the compressor's hot gas refrigerant is transferred through the walls of the heat exchanger 100 into the pump's refrigerant. This lowers the temperature of the compressor's hot gas refrigerant until it reaches the saturation point. Further removal of heat from the compressor's refrigerant changes its state and condenses the refrigerant to a liquid so it can be used over again. The heat exchanger 100 is sized large enough so that the hot gas is cooled to a temperature below that which it is condensed into a liquid. Now at a very low temperature and at a very low enthalpy, the liquid enters the inlet pipe 116 of the evaporator heat exchanger 106 to complete the compressor refrigerant circuit.

Heat exchanger 102 must have sufficient transfer capacity to allow heat to be released into the medium from the pumped refrigerant hot gas as the temperature may rise from either internal or external conditions.

Figure 6:
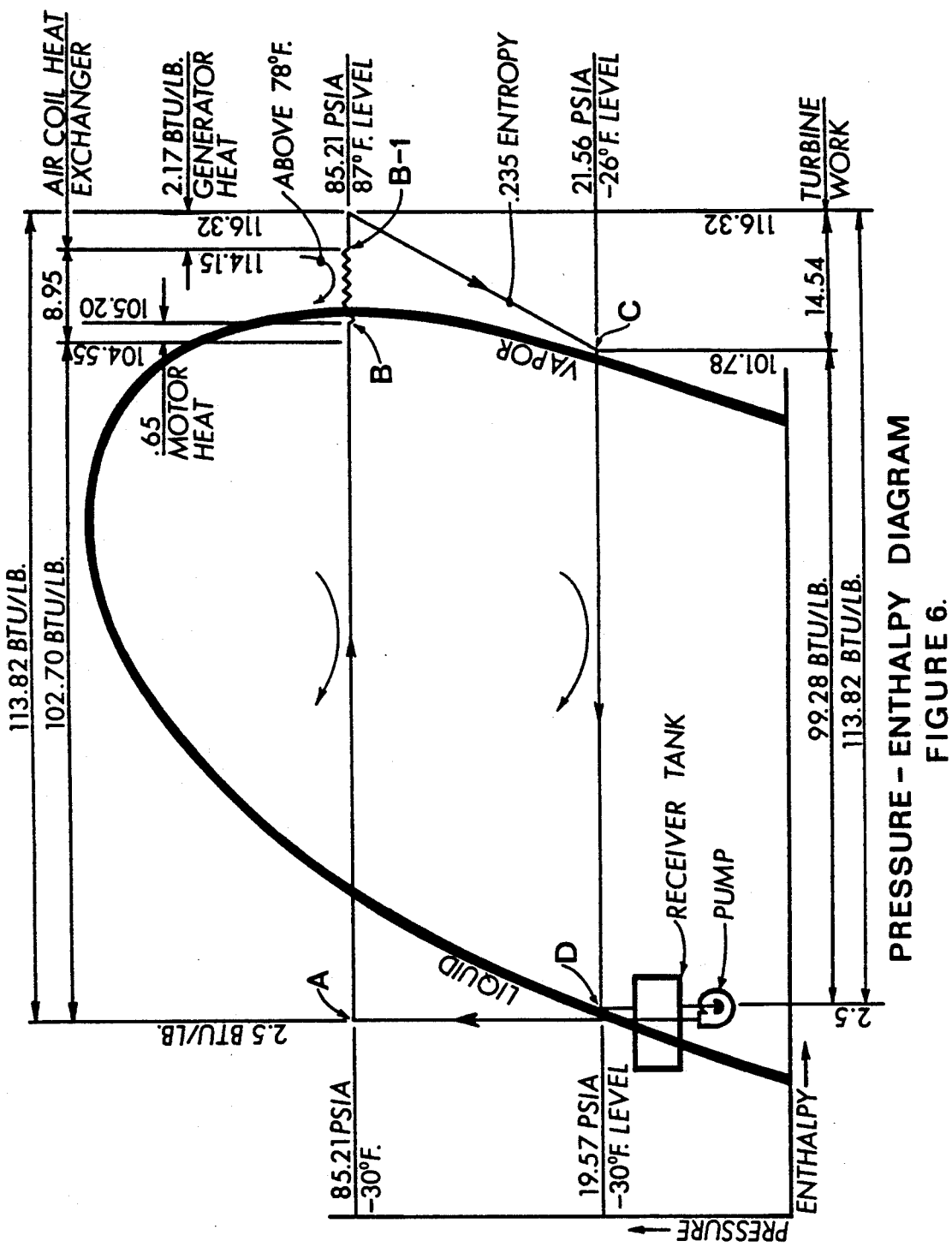
FIG. 6 is a graph illustrating the different pressure and enthalpy levels for the compressor's refrigerant as it flows through the system schematically illustrated in FIG. 5.
Figure 7:
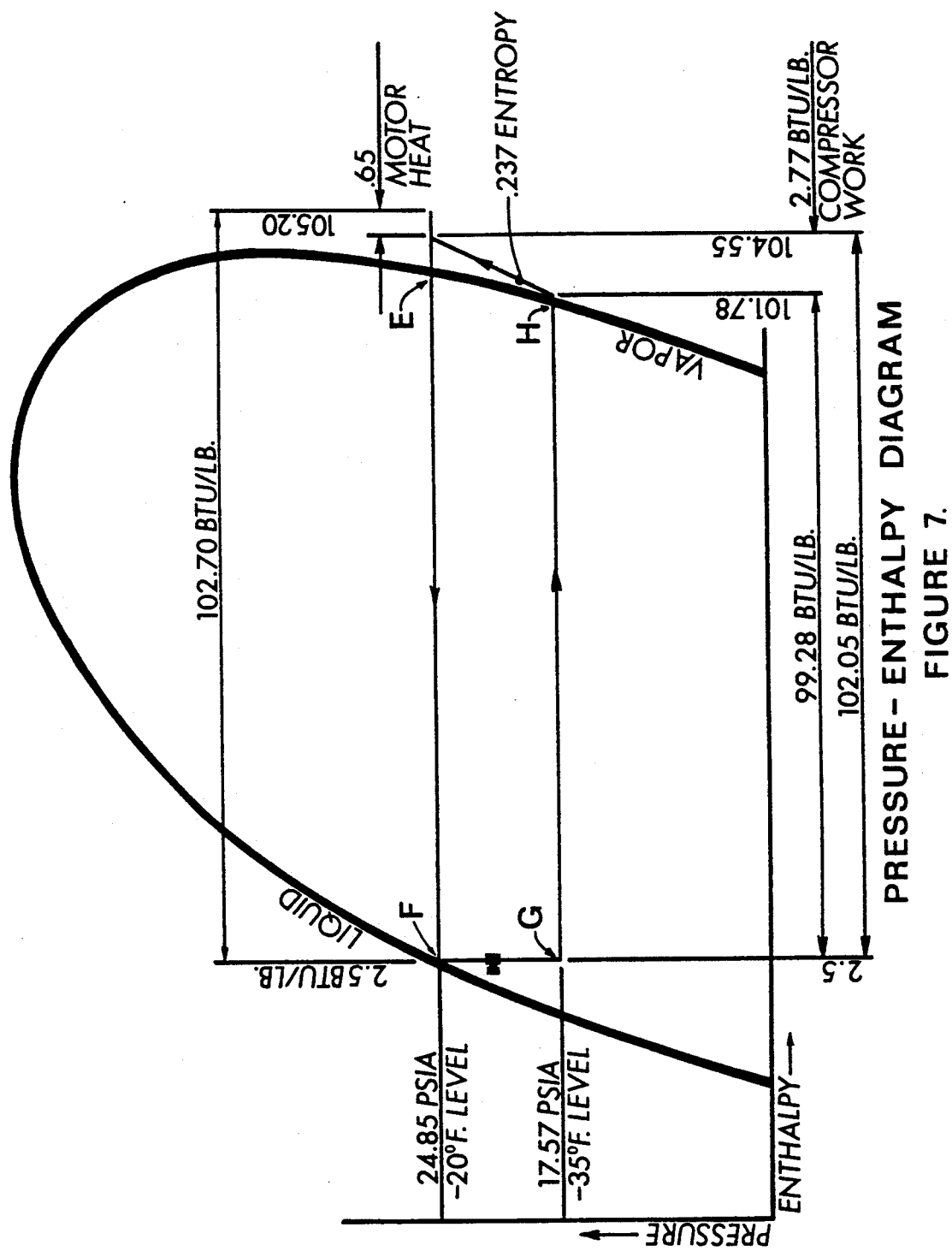
FIG. 7 is a graph illustrating the different pressure and enthalpy levels for the pump's refrigerant as it flows through the system schematically illustrated in FIG. 5.

An illustrative example of flow through Refrigeration System 3 is shown in FIGS. 6 and 7, is as follows. In this example, chlorodifluoromethane refrigerant is used.

Shown in FIG. 6, the refrigerant cooled pump 112 draws liquid refrigerant from the receiver tank 110 and provides refrigerant flow through heat exchanger 100. The compressor's refrigerant flowing across the heat exchanger 100 is minus 20 degrees Fahrenheit. The pump's refrigerant enters the evaporator heat exchanger 100 at minus 30 degrees Fahrenheit, 85.21 PSIA pressure with an enthalpy of 2.50 BTU/LB at point A. As the pump's refrigerant flows through the heat exchanger 100, it boils at minus 30 degrees Fahrenheit to an enthalpy of 105.20 BTU/LB.

From the heat exchanger 100 at point B-1, the pump's refrigerant flows through heat exchanger 102. The fluid medium flowing across the evaporator heat exchanger 102 is air above 78 degrees Fahrenheit. The refrigerant enters the evaporator heat exchanger 102 at minus 30 degrees Fahrenheit, 85.21 PSIA pressure with an enthalpy of 105.20 BTU/LB at point B. As the refrigerant flows through the heat exchanger 102, it boils from minus 30 degrees to a saturated vapor and it becomes super-heated at 78 degrees Fahrenheit with an enthalpy of 114.15 BTU/LB at point B-1.

From the heat exchanger 102 at point B-1, the refrigerant enters the turbine generator 104A. The refrigerant then flows across the generator 118. As the refrigerant flows across the generator 118, its temperature should rise to approximately 87 degrees Fahrenheit with its ethalpy raised to 116.32 BTU/LB at the same pressure of 85.21 PSIA. This results in the extra-super-heated gas that is directed by the turbine nozzles 120 across the turbine blades 126. At an entropy of 0.235 BTU/LB-R, the refrigerant gas temperature drops to minus 26 degrees Fahrenheit, pressure drops to 21.56 PSIA, and its enthalpy drops down to 101.78 BTU/LB as indicated at point C.

The refrigerant in a saturated vapor state leaves point C and flows to point D through a heat exchanger 106. The fluid medium flowing across the heat exchanger 106 is the compressor's evaporating refrigerant. This is absorbing heat from the pump's refrigerant. At point C, the pump's refrigerant is at minus 26 degrees Fahrenheit, 21.56 PSIA pressure and has an enthalpy of 101.78 BTU/LB. As the refrigerant flows through the heat exchanger 106, it condenses at minus 30 degrees Fahrenheit and a pressure of 19.57 PSIA. The refrigerant changes its state to a liquid with an enthalpy of 2.50 BTU/LB. As indicated by point D in the graph. As previously described and as illustrated in the graph, the change in state from point C to point D is the condensing effect provided by the change in state of the evaporating compressor's refrigerant through the walls of the heat exchanger 106.

The liquid is then sent to the receiver tank 110 where it is collected and stored at 19.57 PSIA, minus 30 degrees Fahrenheit and at an enthalpy of 2.50 BTU/LB before entering the suction end of pump 112 to repeat the cycle.

Shown in FIG. 7, the compressor 130 draws refrigerant through the evaporating heat exchanger 106. The sensing device 132, located at the outlet of the heat exchanger 106, is set at 17.57 PSIA which allows the refrigerant to flow through the control valve 134 and into the heat exchanger 106. As the refrigerant flows through the heat exchanger 106 from point G, it boils at minus 35 degrees Fahrenheit to a saturated vapor with an enthalpy of 101.78 BTU/LB at point H.

From the heat exchanger 106, the refrigerant enters the compressor 130, and the heat of compression raises the temperature of the refrigerant to approximately minus 20 degrees Fahrenheit saturated temperature with a pressure of 24.85 PSIA and an enthalpy of 104.55 BTU/LB. The refrigerant then flows over the compressor motor 136, raising the temperature of the refrigerant to approximately minus 19 degrees Fahrenheit with an enthalpy of 105.20 BTU/LB at the same pressure of 24.85 PSIA. Having flowed over the motor 136, the refrigerant then flows into the condenser heat exchanger 100.

The compressor's refrigerant enters the condenser heat exchanger 100 at minus 19 degrees Fahrenheit, 24.85 PSIA pressure with 105.20 BTU/LB enthalpy. As the refrigerant flows through the heat exchanger 100 to point F on the graph, the compressor's refrigerant heat is transferred through the walls of the heat exchanger 100 into the pump's evaporating refrigerant. This changes the compressor's refrigerant from a saturated vapor to a liquid at minus 20 degrees Fahrenheit, 24.85 PSIA pressure with an enthalpy of 2.50 BTU/LB.

From the heat exchanger 100 at point F, the refrigerant flows to heat exchanger 106 to repeat the cycle. By using a turbine in the present invention, the pressure and temperature of the refrigerant used in the system drops to a point where it is substantially a saturated vapor before entering the mechanically cooled condenser heat exchanger 106. This allows reduction of the loss of energy that occurs in the prior art due to the flash gas effect. Elimination of other types of condensers typically found in the prior art from the refrigeration circuit also eliminates costly maintenance and installation commonly required for these condensers especially when the condenser is remotely located from the other components of the refrigeration system. A remote location of the condenser requires long runs of refrigerant piping, electrical wiring and control wiring, thereby increasing losses and costs.

Using a liquid refrigerant pump in the present invention to provide the high refrigerant pressure differences requires much less energy than using a compressor with refrigerant gas typically found in prior art.

In the present invention, the energy for the compressor's small pressure differences is a fractional amount compared to systems of equal cooling capacity found in prior art.

Figure 8:
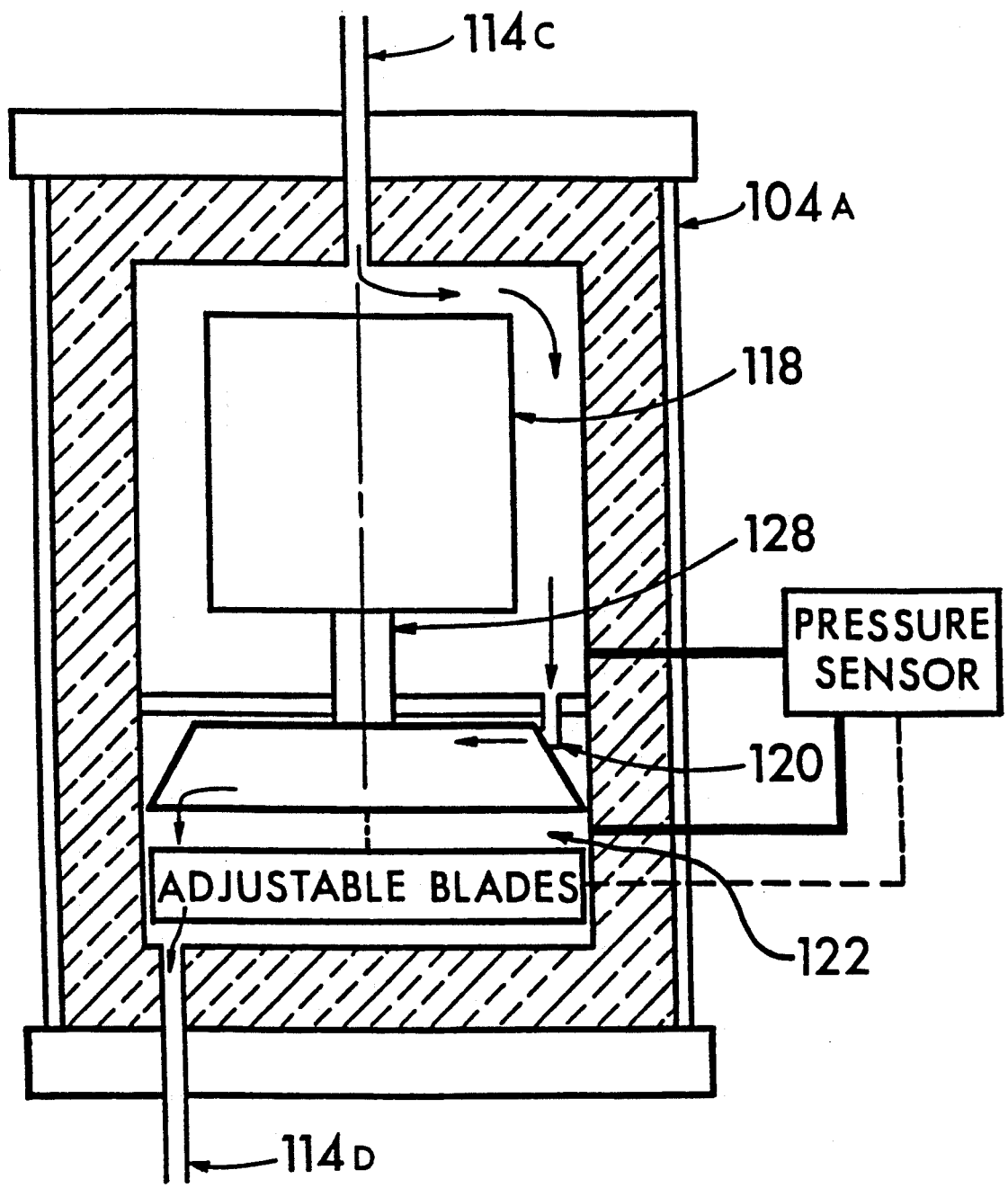
FIG. 8 is a schematic illustration of the adjustable blades and pressure sensing element of the turbine of the present invention.

FIG. 8 illustrates a totally enclosed turbine generator 104A which includes a means for drawing refrigerant vapor from the turbine discharge chamber into the condenser heat exchanger. The refrigerant is direct through piping 114C across an electrical generator 118. The super-heated refrigerant hot gas absorbs dissipated heat energy as it flows across the electric generator 118. The extra super-heated refrigerant gas approaches the turbine nozzles 120 at a relatively low velocity. The gas flows through the nozzles 120 and enters a region of lower pressure 122. The pressure in region 122 is maintained through the use of a second set of blades ("adjustable blades") downstream on the turbine shaft 128 in the low pressure turbine discharge chamber 122. An adjustable pressure sensing device ("pressure sensor") is installed in the turbine discharge chamber so that the pressure in the chamber is controlled to allow a smooth, regular turbine speed. The pressure sensing device monitors the pressure at points upstream and downstream of the first set of turbine blades. The sensing device adjusts the blade pitch of the second set of blades to maintain the desired pressure setting such that the refrigerant leaves the turbine housing through piping 114D at a slightly higher pressure than the turbine discharge chamber pressure, yet at a low pressure, low temperature and slightly lower enthalpy.

Many modifications and variations of the present invention are possible in light of the above teachings. Thus, it is to be understood that within scope of the appended claims, the invention may be practiced other than as specifically expalined in the above description.

I claim:

1. A refrigerant power unit, comprising:
    a closed piping loop;
    refrigerant in said piping loop;
    a pump in said piping loop;
    an evaporator in said piping loop downstream of said pump;
    a rotary machine in said piping loop downstream of said evaporator;
    an electric generator in said piping loop between said evaporator and said rotary machine, said piping loop directing the flow of said refrigerant across said electric generator wherein said refrigerant absorbs heat energy dissipated from said generator;
    a condenser in said piping loop downstream of said rotary machine; and
    a receiver in said piping loop between said condenser and said pump.

2. The refrigerant power unit set forth in claim 1 wherein said rotary machine is a turbine.

3. The refrigerant power unit set forth in claim 1 wherein said rotary machine is a turbine, said turbine includes at least one nozzle and a plurality of blades, said at least one nozzle mounted in said turbine to direct said refrigerant from said pump through said blades.

4. The refrigerant power unit set forth in claim 3 further comprising a pressure sensing element in said turbine, and means for allowing said pressure sensing element to control the blade pitch of a second set of blades downstream of said plurality of blades in said turbine.

5. The refrigerant power unit set forth in claim 1 further comprising an automatic flow control valve at an inlet to said evaporator.

6. The refrigerant power unit set forth in claim 1 further comprising an automatic valve in said closed piping loop at the inlet of said evaporator, a temperature sensing element in said closed piping loop at the outlet of said evaporator, and means for coupling said temperature sensing element to control said automatic valve.

7. The refrigerent power unit set forth in claim 1 further comprising an automatic valve in said closed piping loop at the inlet of said evaporator, a pressure sensing element in said closed piping loop at the outlet of said evaporator, and means for coupling said pressure sensing element and said automatic valve allowing said pressure sensing element to control said automatic valve.

8. A refrigerant power unit, comprising:
a closed first piping loop;
refrigerant in said first piping loop;
a pump in said first piping loop;
a first evaporator in said first piping loop downstream of said pump;
a second evaporator in said first piping loop downstream of said first evaporator;
a rotary machine in said first piping loop downstream of said second evaporator;
a third evaporator in said first piping loop downstream of said rotary machine;
a receiver in said first piping loop between said third evaporator and said pump;
a closed second piping loop;
refrigerant in said second piping loop;
a compressor in said second piping loop downstream of said third evaporator and upstream of said first evaporator, wherein said second piping loop connects said compressor to said first evaporator, said first evaporator to said third evaporator and said third evaporator to said compressor.

9. The refrigerant power unit set forth in claim 8 wherein said rotary machine is a turbine.

10. The refrigerant power unit set forth in claim 8 wherein said rotary machine is a turbine, said turbine includes at least one nozzle and a plurality of blades, said at least one nozzle mounted in said turbine to direct said refrigerant from said pump through said blades.

11. The refrigerant power unit set forth in claim 10 further comprising a pressure sensing element in said turbine, and means for allowing said pressure sensing element to control the blade pitch of a second set of blades downstream of said plurality of blades in said turbine.

12. The refrigerant power unit set forth in claim 8 further comprising an automatic flow control valve in said piping loop between said first evaporator and said third evaporator, wherein said automatic flow control valve is at the inlet of said third evaporator.

13. The refrigerant power unit set forth in claim 8 further comprising a motor in said piping loop between said first evaporator and said compressor, said piping loop directing said refrigerant across said motor wherein said refrigerant absorbs dissipated heat from said motor.

14. The refrigerant power unit set forth in claim 8 further comprising an electric generator in said piping loop between said second evaporator and said rotary machine, said piping loop directing the flow of said refrigerant across said electric generator wherein said refrigerant absorbs heat energy dissipated from said generator.

15. The refrigerant power unit set forth in claim 8 further comprising an automatic valve in said closed piping loop between said first evaporator and said third evaporator, wherein said automatic valve is at the inlet of said third evaporator, a temperature sensing element in said closed piping loop between said condenser and said compressor, wherein said temperature sensing element is at the outlet of said third evaporator, and means for coupling said temperature sensing element to control said automatic valve.

16. The refrigerant power unit set forth in claim 8 further comprising an automatic valve in said closed piping loop between said first evaporator and said third evaporator, wherein said automatic valve is at the inlet of said third evaporator, a pressure sensing element in said closed piping loop at the outlet of said third evaporator, and means for coupling said pressure sensing element and said automatic valve allowing said pressure sensing element to control said automatic valve.

17. An air conditioning system, comprising:
a gas tight piping system;
refrigerant in said piping system;
an evaporator heat exchanger including an inlet and an outlet in said piping system;
a pump in fluid communication with said inlet of said evaporator heat exchanger;
an insulated shell in said piping system, said shell including an intake port, said piping system communicating said outlet of said evaporator heat exchanger with said intake port;
a generator in fluid communication with said intake port, means for directing said refrigerant over said generator;
a turbine, including a plurality of blades and a plurality of nozzles, coupled to said generator, means for directing said refrigerant through said nozzles and over said blades;
a condenser heat exchanger including an inlet and outlet in said piping system; means for directing said refrigerant from said blades to said inlet of said condenser heat exchanger;
a receiver; means for directing said refrigerant from said outlet of said condenser heat exchanger to said receiver, said piping system communicating said receiver with said pump.

18. The air conditioning system set forth in claim 17 further comprising a pressure sensing element in said turbine, and means for allowing said pressure sensing element to control the blade pitch of a second set of blades downstream of said plurality of blades in said turbine.

19. The air conditioning system set forth in claim 17 further comprising an automatic flow control valve in said inlet of said evaporator heat exchanger, a sensing device in said outlet of said evaporator heat exchanger, and means for interactively connecting said flow control valve and said sensing device.

20. The air conditioning system set forth in claim 17 wherein said refrigerant is chlorodifluoromethane.

21. The air conditioning system set forth in claim 17 wherein said refrigerant is ammonia.

22. An air conditioning system, comprising:
a gas tight piping system;
refrigerant in said piping system;

a first evaporator heat exchanger including an inlet and an outlet in said piping system;

a pump in fluid communication with said inlet of said first evaporator heat exchanger;

a flash tank including two inlets and an outlet in said piping system, an inlet of said flash tank in fluid communication with said outlet of said first evaporator heat exchanger;

a second evaporator heat exchanger including an inlet and an outlet in said piping system;

an insulated shell in said piping system, said shell including an intake port, said piping system communicating said outlet of said second evaporator heat exchanger with said intake port;

a compressor in fluid communication with said intake port, means for directing said refrigerant into said compressor;

a motor coupled to said compressor, means for directing said refrigerant over said motor; said piping system communicating the outlet port of said insulated shell with an inlet of said flash tank;

an insulated second shell in said piping system, said second shell including an intake port, said piping system communicating said outlet of said flash tank with said intake port of said second shell;

a generator in fluid communication with said intake port of said second shell, means for directing said refrigerant over said generator;

a turbine, including a plurality of blades and a plurality of nozzles, coupled to said generator, means for directing said refrigerant through said nozzles and over said blades;

a condenser heat exchanger including an inlet and outlet in said piping system; means for directing said refrigerant from said blades to said inlet of said condenser heat exchanger;

a receiver; means for directing said refrigerant from said outlet of said condenser heat exchanger to said receiver, said piping system communicating said receiver with said pump and said inlet of said second evaporator heat exchanger.

23. The air conditioning system set forth in claim 22 further comprising a pressure sensing element in said turbine, and means for allowing said pressure sensing element to control the blade pitch of a second set of blades downstream of said plurality of blades in said turbine.

24. The air conditioning system set forth in claim 22 further comprising an automatic flow control valve in said outlet of said second evaporator heat exchanger, a sensing device in said inlet of said second evaporator heat exchanger, and means for interactively connecting said flow control valve and said sensing device.

25. The air conditioning system set forth in claim 22 wherein said refrigerant is chlorodifluoromethane.

26. The air conditioning system set forth in claim 22 wherein said refrigerant is ammonia.

27. A method of refrigeration, the steps comprising:
moving refrigerant with a low enthalpy, temperature and pressure through an evaporator coil;
passing a medium over said evaporator coil thereby cooling said medium and increasing the enthalpy and temperature of said refrigerant;
moving said refrigerant over a generator increasing the enthalpy and temperature of said refrigerant;
moving said refrigerant through a turbine reducing the enthalpy, temperature and pressure of said refrigerant;
moving said refrigerant through a condenser coil;
passing a medium over said condenser coil thereby heating said medium and decreasing the enthalpy of said refrigerant; and
returning said refrigerant to said evaporator coil.

28. The method of refrigeration set forth in claim 27 further comprising the step of reducing the enthalpy, temperature and pressure of said refrigerant by moving said refrigerant through nozzles in said turbine and over blades of said turbine.

29. The method of refrigeration set forth in claim 28 further comprising the step of adjusting the blade pitch of a second set of blades in said turbine in response to sensed pressure in said turbine.

30. The method of refrigeration set forth in claim 27 further comprising the step of moving said refrigerant into a receiver after moving said refrigerant through said condenser.

31. The method of refrigeration set forth in claim 27 further comprising the step of controlling the flow of refrigerant into said evaporator coil in response to sensed temperature downstream of said evaporator coil.

32. The method of refrigeration set forth in claim 27 further comprising the step of controlling the flow of refrigerant into said evaporator coil in response to sensed pressure downstream of said evaporator coil.

33. A method of refrigeration, the steps comprising:
compressing a first refrigerant increasing the enthalpy, temperature and pressure of said refrigerant in the compressor;
passing said first refrigerant over a first evaporator coil thereby decreasing the enthalpy and cooling said first refrigerant;
moving said first refrigerant through a third evaporator coil thereby increasing the temperature and enthalpy of said first refrigerant, returning said first refrigerant to said compressor;
moving a second refrigerant with a low enthalpy, temperature and pressure through said first evaporator coil thereby increasing the enthalpy of said second refrigerant;
moving said second refrigerant through a second evaporator coil;
passing a medium over said second evaporator coil thereby cooling said medium and increasing the enthalpy and temperature of said second refrigerant;
moving said second refrigerant through a turbine reducing the enthalpy, temperature and pressure of said second refrigerant;
passing said second refrigerant over said third evaporator coil thereby decreasing the temperature, pressure and enthalpy of said second refrigerant; and
returning said refrigerant to said first evaporator coil.

34. The method of refrigeration set forth in claim 33 further comprising the step of moving said refrigerant over a motor after compressing said refrigerant, increasing the enthalpy and temperature of said refrigerant.

35. The method of refrigeration set forth in claim 33 further comprising the step of moving said second refrigerant over a generator increasing the enthalpy and temperature of said refrigerant before moving said second refrigerant through said turbine.

36. The method of refrigeration set forth in claim 33 further comprising the step of reducing the enthalpy, temperature and pressure of said second refrigerant by moving said second refrigerant through nozzles in said turbine and over blades of said turbine.

37. The method of refrigeration set forth in claim 36 further comprising the step of adjusting the blade pitch of a second set of blades in said turbine in response to sensed pressure in said turbine.

38. The method of refrigeration set forth in claim 33 further comprising the step of moving said second refrigerant into a receiver after moving said second refrigerant over said third evaporator coil.

39. The method of refrigeration set forth in claim 33 further comprising the step of controlling the flow of said first refrigerant into said third evaporator coil in response to sensed temperature downstream of said third evaporator coil.

40. The method of refrigeration set forth in claim 33 further comprising the step of controlling the flow of said refrigerant into said third evaporator coil in response to sensed pressure downstream of said third evaporator coil.

41. An air conditioning system, comprising:
a gas tight first piping system;
refrigerant in said first piping system;
a first evaporator coil including an inlet and an outlet in said first piping system;
a pump in fluid communication with said inlet of said first evaporator coil;
a second evaporator coil including an inlet and outlet in said first piping system; means for directing said first refrigerant from said outlet of said first evaporator coil to said inlet of said second evaporator coil;
an insulated shell in said first piping system, said shell including an intake port, said first piping system communicating said outlet of said second evaporator coil with said intake port;
a generator in fluid communication with said intake port, means for directing said first refrigerant over said generator;
a turbine, including a plurality of blades and a plurality of nozzles, coupled to said generator, means for directing said first refrigerant through said nozzles and over said blades;
a third evaporator heat exchanger including an inlet and outlet in said first piping system; means for directing said first refrigerant from said blades over a third evaporator coil of said third evaporator heat exchanger;
a receiver; means for directing said first refrigerant from said outlet of said third evaporator heat exchanger to said receiver, said first piping system communicating said receiver with said pump;
a gas tight second piping system;
a second refrigerant in said piping system;
an insulated shell in said second piping system, said shell including an intake port;
a compressor in fluid communication with said intake port, means for directing said second refrigerant into said compressor;
a motor coupled to said compressor, means for directing said second refrigerant over said motor; said second piping system communicating the outlet port of said insulated shell with an inlet of the first evaporator; means for directing said second refrigerant over said first evaporator coil; said second piping system communicating an outlet of said first evaporator with said inlet of said third evaporator coil; said second piping system communicating said outlet of said third evaporator coil with said intake port.

42. The air conditioning system set forth in claim 41 further comprising a pressure sensing element in said turbine, and means for allowing said pressure sensing element to control the blade pitch of a second set of blades downstream of said plurality of blades in said turbine.

43. The air conditioning system set forth in claim 41 further comprising an automatic flow control valve in said inlet of said third evaporator coil, a sensing device in said outlet of said condenser coil, and means for interactively connecting said flow control valve and said sensing device.

44. The air conditioning system set forth in claim 41 wherein said first refrigerant is chlorodifluoromethane.

45. The air conditioning system set forth in claim 41 wherein said first refrigerant is ammonia.

* * * * *